Aug. 31, 1937. J. SMILACK 2,091,459
REFRIGERATING APPARATUS
Filed March 13, 1935

INVENTOR.
JACOB SMILACK.
BY
Spencer, Hardman and Fehr.
HIS ATTORNEYS.

Patented Aug. 31, 1937

2,091,459

UNITED STATES PATENT OFFICE 2,091,459

REFRIGERATING APPARATUS

Jacob Smilack, Dayton, Ohio, assignor to General Motors Corporation, Detroit, Mich., a corporation of Delaware Application March 13, 1935, Serial No. 10,912

8 Claims. (Cl. 220—14)

This invention relates to refrigerating apparatus and particularly to refrigerated ice cream storage cabinets.

Ice cream storage cabinets are usually constructed with a plurality of vertically disposed receptacles forming open-top compartments for the reception of containers or cans of ice cream which compartments are closed by insulated doors or lids. The ice cream cans or containers are ordinarily of smaller diameter than walls of the compartment and therefore are in spaced relation to the compartment walls when placed in the compartment. This free fitting of an ice cream can or container in the compartment provided therefor inherently leaves or forms a space around the container. Some ice cream falls down into the space between the container and walls of the container compartment during the act of dipping or dispensing ice cream from the containers in the cabinet. Some ice cream is thereby lost or wasted and an unsanitary condition is created in the cabinet. In addition air from the atmosphere externally of the cabinet enters this space upon removal of the lid or door which closes the compartment and this air upon being chilled causes condensation of moisture upon walls of the compartment and the container. The moisture continues to accumulate or build up on the container or on walls of the compartment in the form of frost or ice and after a period of time this frost or ice may prevent or interfere with the removal of the ice cream can or container.

I am aware that others have suggested the use of some means for preventing ice cream from falling into the space between the container and walls of the compartment and to close the space to prevent entrance of air thereinto when the cabinet lid is removed. However, those means suggested by others have not been entirely satisfactory. For example, it has been suggested to place a relatively hard molded rubber ring between the walls of the compartment and the top portion of the ice cream can or container. While such a ring accomplishes the desired results it is nevertheless a source of trouble in removing the container from the compartment. Of the rings known to me there are none which permits removal of the ice cream can or container from its compartment without first removing the ring from the cabinet. Some of these rings are difficult to remove and after being removed are often damaged by careless handling thereof. My invention is therefore directed to an improved device for closing the space between an ice cream can or container and walls of the container compartment which device will overcome the difficulties encountered in the use of similar prior devices.

An object of the present invention is to provide an attachment for ice cream cabinets which will effectively close the space between the ice cream container and the container compartment wall and which will permit removal of the container from the compartment and replacement of container in the compartment without removing the closure attachment from the cabinet.

Another object of the invention is to provide an improved device of the character described in the foregoing object which will tightly engage the walls of ice cream cans or containers of different diameters for the purpose described.

A still further object of the invention is to provide an improved device of the character described which will be efficient, reliable in use and capable of being manufactured at low cost while at the same time being detachable from the cabinet without dismantling same for replacing the device should it become damaged.

Further objects and advantages of the present invention will be apparent from the following description, reference being had to the accompanying drawing, wherein a preferred form of the present invention is clearly shown.

Figure 1:
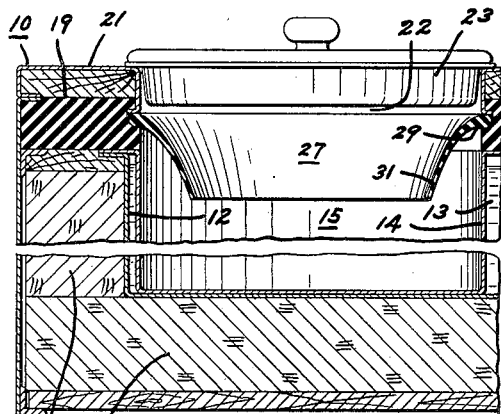
Fig. 1 is a fragmentary vertical sectional view of a portion of an ice cream storage cabinet having my improved device incorporated therein.

Referring to the drawing, for the purpose of illustrating the present invention, I have shown in Fig. 1 thereof a portion of an ice cream cabinet of conventional construction and generally designated by the reference character 10. Cabinet 10 includes a plurality of insulated walls 11 which have an inner lining member 12 forming a chamber 13 adapted to receive a brine solution or any other suitable refrigerating medium which may be cooled in any desired manner. Within the chamber 13 there is positioned a plurality of receptacle walls 14 which form a compartment 15 for the reception of a container or can 17 (See Figs. 2 and 3) containing ice cream or the like substance to be maintained in a frozen condition. The can 17 has been omitted from Fig. 1 for the sake of clearness and in order to show the device of the present invention in a position adapted to engage the container or can 17 when same is placed in the compartment 15. Cabinet 10 includes a sub-top 19 constructed of molded hard rubber or any other suitable insulating material and which is covered with a sheet metal exterior finish panel 21. The cabinet sub-top 19 has an opening 22 therein which provides access to compartment 15 and which opening is ordinarily closed by a lid or door 23. The wall of opening 22 in sub-top 19 has a groove 25 formed therein which groove is adapted to receive a portion of a ring, collar or annulus member 27 preferably formed of rubber or the like material and which groove serves to secure the member 27 to the cabinet.

Figure 6:
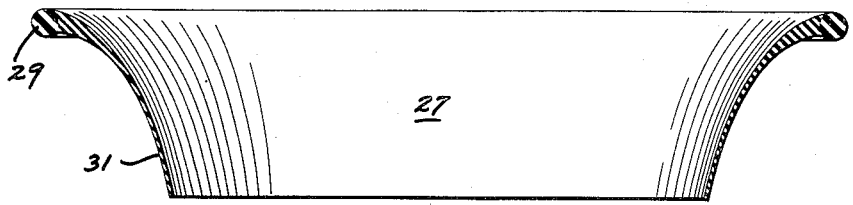
Fig. 6 is an enlarged sectional view of the device shown in Fig. 5 and taken on the lines 6—6 thereof.
Figure 5:
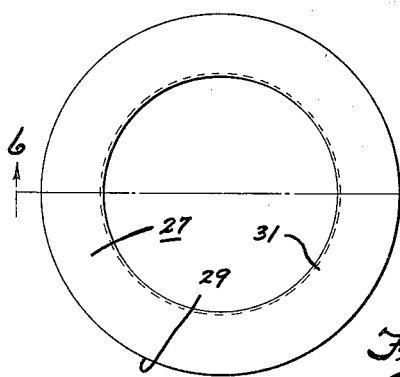
Fig. 5 is a top plan view of the improved device of the present invention.

By referring to Figs. 5 and 6 it will be noted that the ring, collar or annulus member 27 comprises an upper heavy ring portion 29 preferably formed or molded of relatively hard but semi-flexible rubber. Formed integral with the ring portion 29 of the annulus member 27 and depending therefrom is a thin very flexible rubber skirt portion 31 which is molded into a somewhat cone shape. Since the ice cream can storage compartment of refrigerator cabinets are ordinarily constructed to receive cans of a certain and similar content capacity which cans vary in size, that is, both in height and in diameter, the skirt portion 31 of annulus member 27 must be made or arranged so as to engage walls of the various sized cans or containers. Therefore it will be noted that the diameter at the open-bottom of the flexible skirt portion 31 of the member 27 is considerably less than the diameter of the upper semi-flexible ring portion 29 thereof. The skirt portion 31 of the annulus member 27 may be molded of "Latex" rubber which is well-known as being capable of stretching over wide dimensions without causing tearing thereof. The method of forming an annulus member of the construction and type disclosed is well-known to those skilled in the art and no detailed description is believed to be herein necessary. In installing the annulus member 27 in cabinet 10 the upper or semi-flexible ring portion 29 thereof is compressed or slightly deformed so as to be insertable into the opening 22 in the top of cabinet 10. The ring portion 29 of member 27 is sufficiently resilient to spring back into its original circular shape or diameter when placed in horizontal alignment with the groove 25. Therefore the ring portion 29 of member 27 moves or snaps into the groove 25 and tightly engages the walls thereof to retain the member in place in the compartment 15. The annulus member 27 can, however, after being installed in cabinet 10, be readily removed from the cabinet for replacement or for any other desired purpose by pulling upwardly on the skirt portion 31 thereof or by applying a screw-driver or the like tool between the wall of groove 25 and the semi-rigid ring portion 29 of the member.

Figure 2:
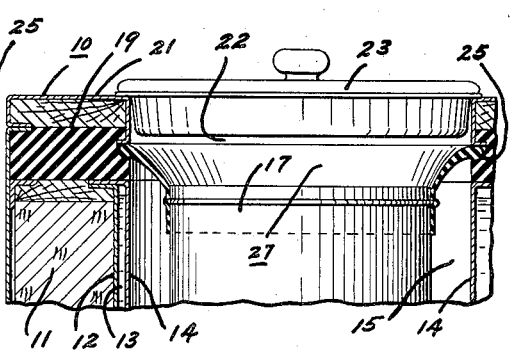
Fig. 2 is a view similar to Fig. 1 and shows a tall ice cream can or container disposed in the cabinet.

Referring now to Fig. 2 of the drawing it will be noted that a tall can or container 17 of, say for example, 10 gallon capacity has been placed in the compartment 15 of cabinet 10. The insertion of the can 17 into compartment 15 has caused the can to pass through the annulus member 27 while said member has been held in place in compartment 15 by engagement of the ring portion 29 thereof within groove 25. The flexible skirt portion of the annulus member has been tightly stretched over the sides of the can 17 to close the opening between the can 17 and walls 14 of the compartment 15 to seal the space therebetween against entrance of air and to prevent the dropping of ice cream into the space.

Figure 3:
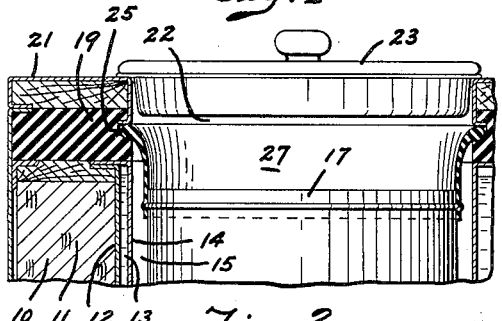
Fig. 3 is a view similar to Figs. 1 and 2 but shows a short ice cream can or container disposed in the cabinet.

In Fig. 3 I have shown a short ice cream can, of 10 gallon capacity and which is slightly larger in diameter than the can shown in Fig. 2, as being placed in the cabinet 10. The insertion of the can 17 into compartment 15 has caused the can to pass through the annulus member 27 while this member has been held in place or prevented from moving downwardly into compartment 15 by the tight engagement of the ring portion 29 thereof within groove 25. The skirt portion 31 of the annulus member 27 has been stretched over the sides of can 17 more tightly than over the sides of the can shown in Fig. 2 due to the increased diameter of the can disclosed in Fig. 3. Annulus member 27 thereby closes the opening between the can 17 and walls 14 of compartment 15 in the same manner and for the same purposes as described relative to the showing of the apparatus in Fig. 2. The difference in the size of the cans 17 shown in Figs. 2 and 3 can be seen by observing the distance from the top of the cabinet 10 to the top of the can 17 in Fig. 3 when the can is resting on the bottom wall of compartment 15.

Figure 4:
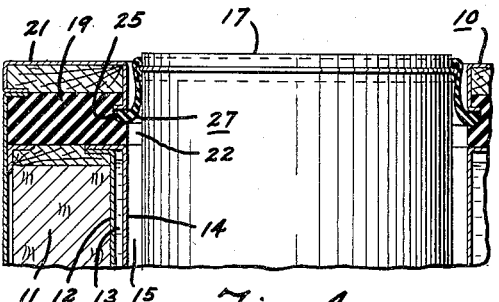
Fig. 4 is a view similar to Figs. 1, 2 and 3 showing a position my improved device assumes during the act of removing an ice cream can or container from its compartment in the cabinet.

Referring now to Fig. 4 of the drawing I have shown the position and deformation of the flexible skirt portion 31 of the annulus member 27 during the act of removing the can or container 17 from the cabinet 10. It will be noted that the can 17 must be withdrawn from compartment 15 by pulling same through the annulus member. The annulus member 27 is virtually turned inside out during the removal of a can 17 from the compartment 15 or, in other words, it is pulled upwardly into a position so as to extend above the top surface of the cabinet 10. The skirt portion 31 of the annulus member 27 may again be returned to its normal position within compartment 15 by pushing same downwardly with the hands or by inserting another ice cream can into the compartment 15 of cabinet 10 through the annulus member.

It is to be understood that my invention may, if desired, be carried out by expanding a separate spring-like ring or hoop-skirt member within a flexible annulus member to force the annulus member against side walls of the compartment, or such a spring ring may be molded in the semi-flexible ring portion 29 of the member 27 to cause expansion of ring portion 29 of the annulus member 27 in groove 25 without departing from the scope of the appended claims.

It will be seen therefore that I have provided an improved refrigerating apparatus wherein an improved device for closing the space between the ice cream can or container and walls of the container compartment is employed. My improved closure device effectively seals the space between the ice cream container and the container compartment walls while at the same time permitting removal of a container from the compartment and insertion of a container into the compartment without removing the device from the cabinet. Thus my invention eliminates the necessity of handling the sealing ring during the act of replacing cans of ice cream in refrigerator cabinets.

While the form of embodiment of the invention as herein disclosed, constitutes a preferred form, it is to be understood that other forms might be adopted, all coming within the scope of the claims which follow.

What is claimed is as follows:

1. A refrigerating apparatus comprising in combination, a cabinet, means forming a compartment within said cabinet for the reception of a container in spaced relation to walls of said compartment, means in the wall of said compartment for receiving an annulus member, an annulus member having a portion secured by said second named means to said cabinet for holding the member in place within said compartment, and said annulus member also including a substantially cone-shaped flexible insulating skirt portion formed integral with and extending from said secured portion thereof and engaging the outside of a container adapted to be positioned in said compartment for closing the space between the container and said compartment walls.

2. A refrigerating apparatus comprising in combination, a cabinet, means forming a compartment within said cabinet for the reception of a container in spaced relation to walls of said compartment, a molded rubber annulus member within said compartment, said annulus member including a heavy semi-flexible upper portion secured to said cabinet for holding the member in place within said compartment, and said annulus member also including a flexible skirt portion extending from said heavy semi-flexible upper portion thereof and engaging the outside of the upper portion of the container adapted to be located in said compartment for closing the space between the container and said compartment walls.

3. A refrigerating apparatus comprising in combination, a cabinet, means forming a compartment within said cabinet for the reception of a container in spaced relation to walls of said compartment, a molded rubber annulus member within said compartment, said annulus member including a heavy semi-flexible upper portion secured to said cabinet for holding the member in place within said compartment, and said annulus member also including a substantially cone-shaped skirt portion extending downwardly from said heavy semi-flexible upper portion thereof, and said skirt portion of said annulus member being readily flexed for engaging the outside of the upper portion of containers of different diameter adapted to be positioned in said compartment for closing the space between the containers and said compartment walls.

4. A refrigerating apparatus comprising in combination, a cabinet, means forming a compartment within said cabinet for the reception of a container in spaced relation to walls of said compartment, a groove in the upper portion of said compartment walls for receiving an annulus member, a molded rubber annulus member having a heavy semi-flexible portion disposed in said groove for holding the member in place within said compartment, said molded annulus member also including a flexible rubber skirt portion extending downwardly from said heavy semi-flexible portion thereof, and said flexible skirt portion of said annulus member being adapted to engage the upper portion of the container adapted to be located in said compartment for closing the space between the container and said compartment walls.

5. A refrigerating apparatus comprising in combination, a cabinet, means forming a compartment within said cabinet for the reception of a container in spaced relation to walls of said compartment, a groove in the upper portion of said compartment walls for receiving an annulus member, a molded rubber annulus member having a heavy semi-flexible portion disposed in said groove for holding the member in place within said compartment, said molded annulus member also including a flexible rubber skirt portion extending downwardly from said heavy semi-flexible portion thereof, said flexible skirt portion of said annulus member being adapted to engage the upper portion of the container adapted to be located in said compartment for closing the space between the container and said compartment walls, and said annulus member being detachable from said cabinet for replacement thereof.

6. A refrigerating apparatus comprising in combination, a cabinet, means forming a compartment within said cabinet for the reception of a container in spaced relation to walls of said compartment, a molded rubber annulus member including a portion secured to said cabinet for holding the member in place within said compartment, said annulus member also including a skirt portion extending from said secured portion thereof and engaging the outside of the container adapted to be located in said compartment for closing the space between the container and said compartment walls, and said skirt portion of said annulus member being flexible and permitting movement of the container into and out of said compartment without removing the member from said cabinet.

7. A refrigerating apparatus comprising in combination, a cabinet, means forming a compartment within said cabinet for the reception of a container in spaced relation to walls of said compartment, a molded rubber annulus member including a portion secured to said cabinet for holding the member in place within said compartment, said annulus member also including a skirt portion extending from said secured portion thereof and engaging the outside of the container adapted to be located in said compartment for closing the space between the container and said compartment walls, said skirt portion of said annulus member being flexible and permitting movement of the container into and out of said compartment without removing the member from said cabinet, and said annulus member being detachable from said cabinet for replacement thereof.

8. A refrigerating apparatus comprising in combination, a cabinet, means forming a compartment within said cabinet for the reception of a container in spaced relation to the walls of said compartment, an annulus member having a portion thereof secured to said cabinet for holding the member in place within said compartment, said annulus member also having an insulating skirt portion extending from said secured portion thereof for engaging a container adapted to be positioned in said compartment for closing the space between the container and said compartment walls, said skirt portion of said annulus member being flexible for engaging containers of substantially different sizes relative to one another and adapted to be selectively positioned in said compartment, and said annulus member also being constructed and arranged to permit movement of said container into or out of said compartment without causing detachment and removal of the member from the cabinet.

JACOB SMILACK.